INVENTORS
HAROLD AUGER
WARD E. PEARSON, Deceased, by
Natalie P. Nicholson, Executrix
BY *Norris & Bateman*
ATTORNEYS

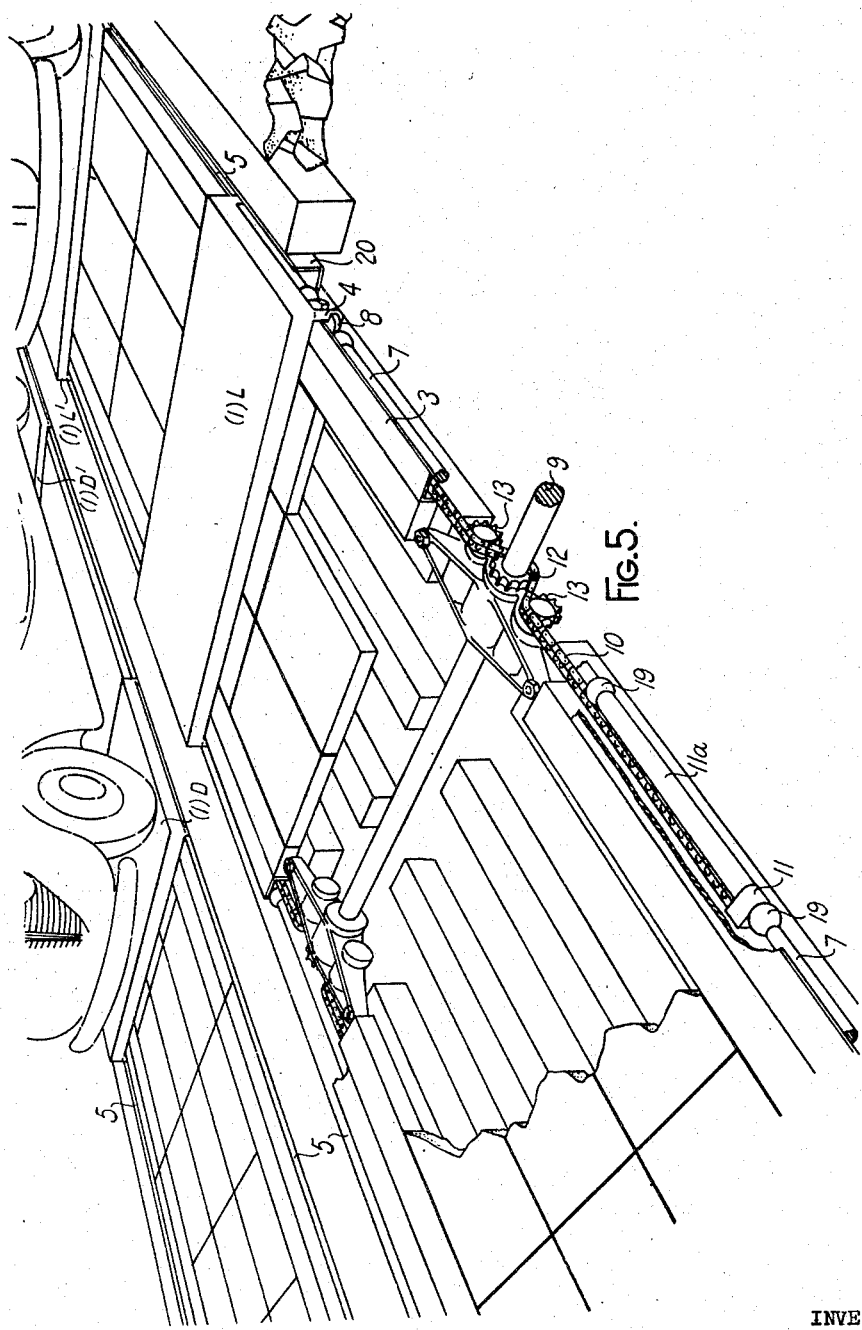

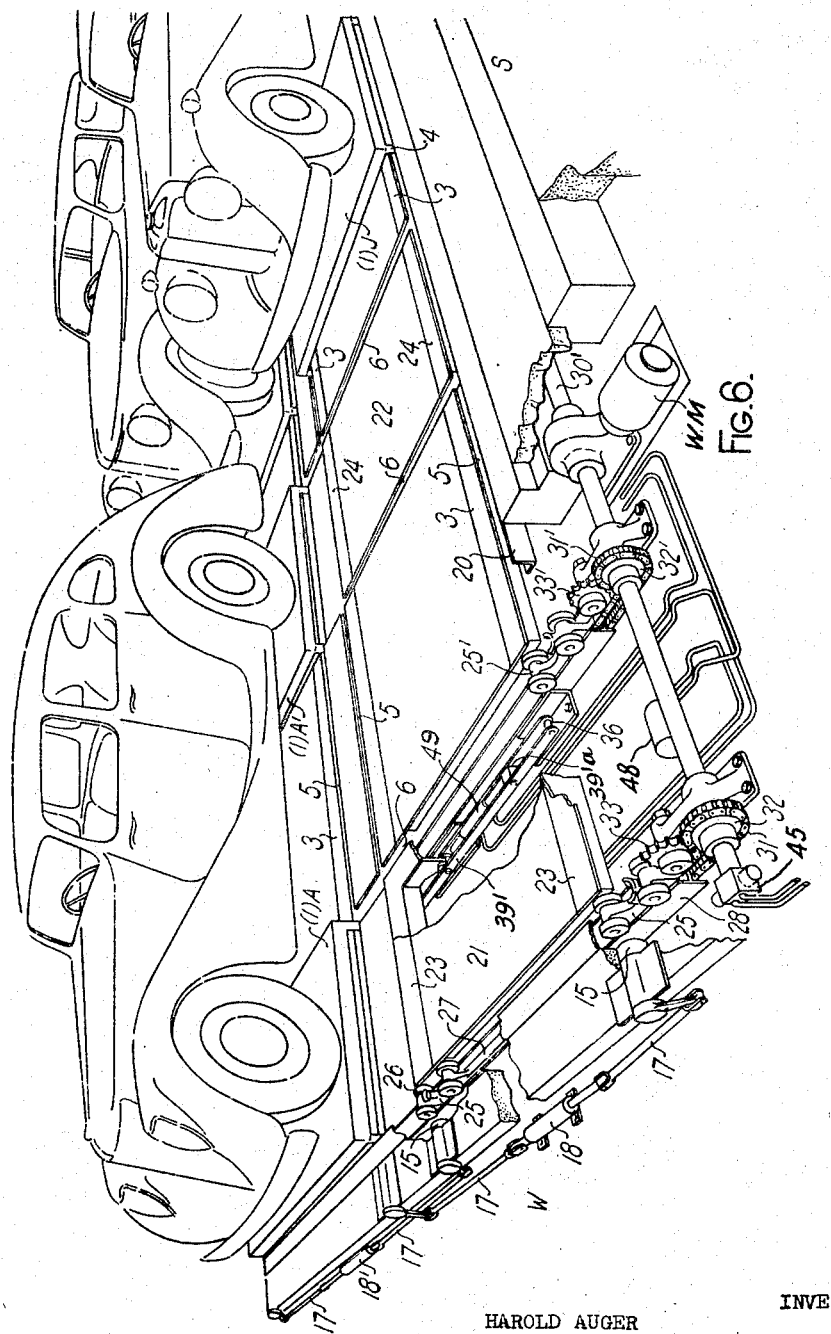

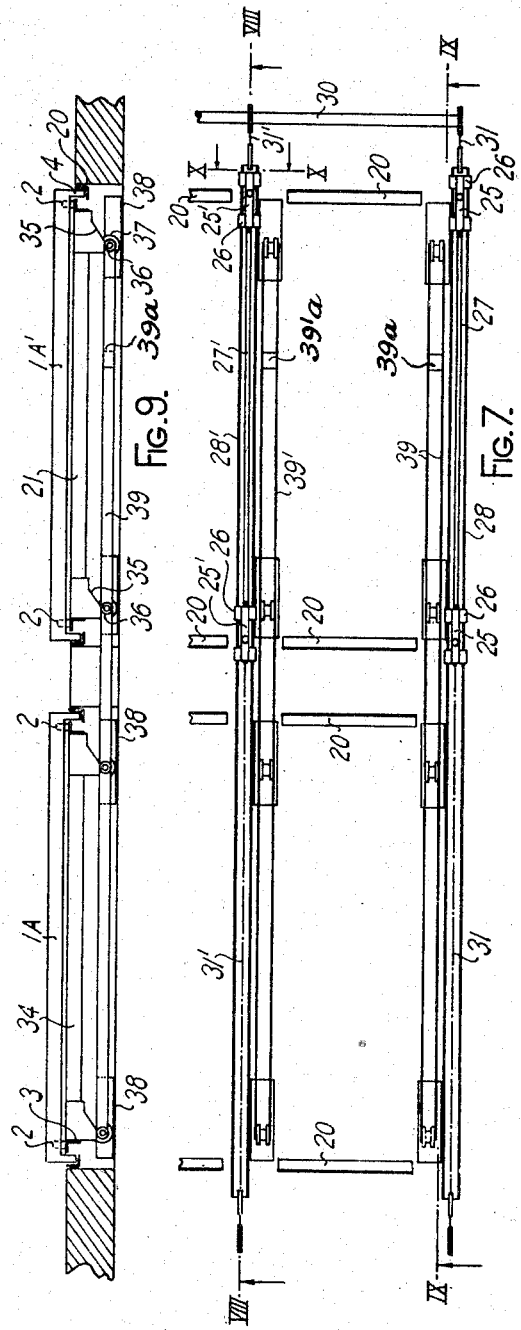

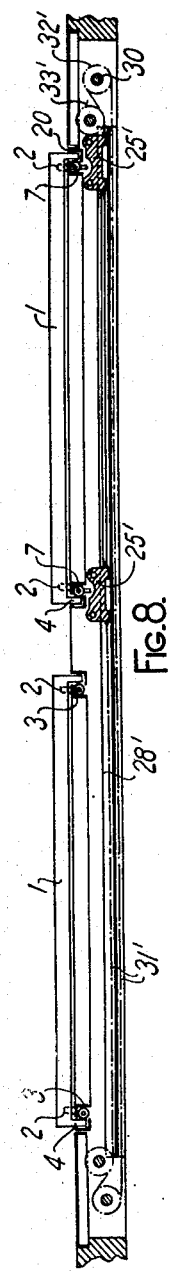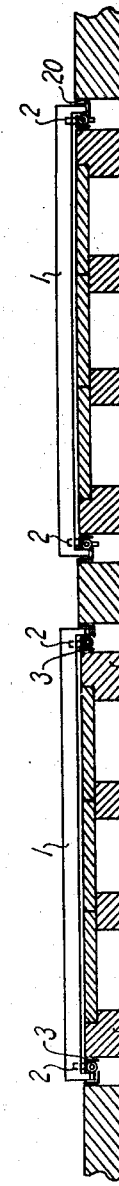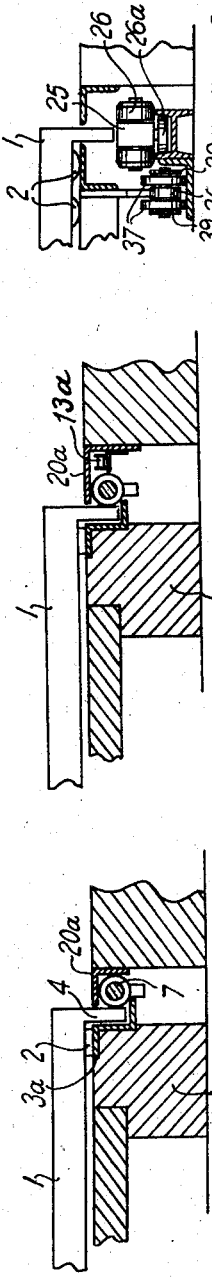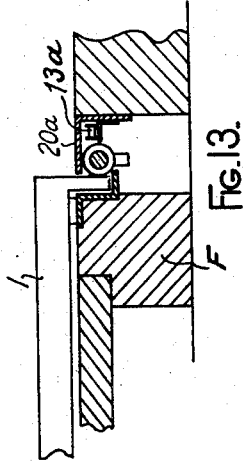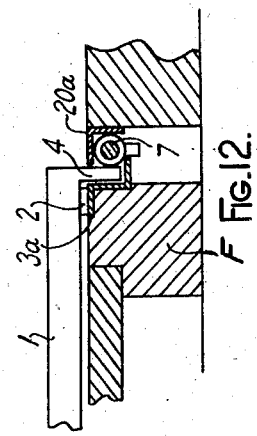

Oct. 7, 1941.  H. AUGER ET AL  2,258,530
STORAGE AND LIKE EQUIPMENT
Filed Sept. 14, 1939    10 Sheets-Sheet 6

INVENTORS
HAROLD AUGER
WARD E. PEARSON, Deceased, by
  Natalie P. Nicholson, Executrix
BY  Norris & Bateman
ATTORNEYS

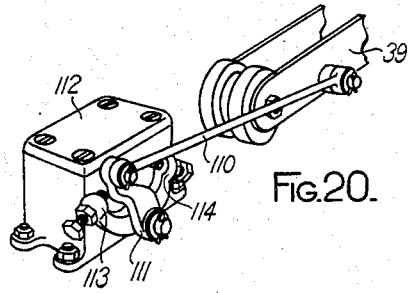
FIG.20.
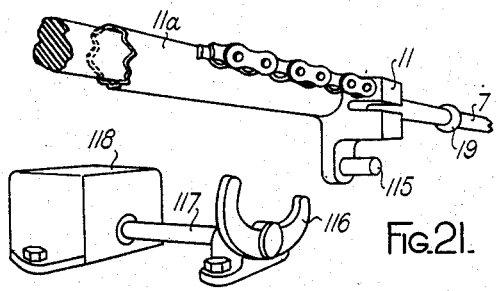
FIG.21.
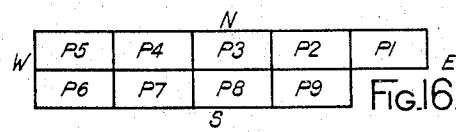
FIG.16.
FIG.17.

UNITED STATES PATENT OFFICE 2,258,530

STORAGE AND LIKE EQUIPMENT

Harold Auger, Burnham, England, and Ward Edgerly Pearson, deceased, late of London, England, by Natalie Pearson Nicholson, executrix, Maidenhead, England Application September 14, 1939, Serial No. 294,964
In Great Britain September 15, 1938

11 Claims. (Cl. 214—16.1)

This invention relates to storage and like equipment and is particularly applicable to the construction of improved garages for storing motor cars.

An important object of the invention is to provide improved storage equipment in which the articles to be stored are mounted on platforms which are circulated around the unit until a vacant platform is brought opposite to an entry position for loading or until a platform containing the required article is brought opposite an exit for unloading.

Another object of the invention is to provide preselector apparatus which effects the platform movements in a recurring sequence through a predetermined number of cycles until a desired platform is brought opposite an entry or exit position. A further object is to provide a garage satisfying all the above objects.

According to the present invention the storage equipment includes a unit comprising a plurality of platforms for supporting articles to be stored, which platforms are arranged in two ranks, apparatus for shifting all the platforms in a rank simultaneously along a rank, apparatus for transferring platforms between adjacent ends of the two ranks and control apparatus for actuating the rank shifting and transferring apparatus so as to effect movement automatically in a recurring sequence such as to circulate platforms around the unit, each said control apparatus including a multi-position control device which initiates the platform movements in accordance with its positioning, follow-up apparatus actuated upon the completion of a platform movement to step the control device forward to the next position and means for arresting movement of the control device in said next position until completion of the corresponding platform movement. Preferably the two ranks are arranged in the same horizontal plane but this need not necessarily be the case, whilst in the case of a garage each car is preferably supported on a plurality of platforms, the preferred arrangement being one in which the front wheels are supported on one platform and the rear wheels on another, the cars extending longitudinally of the ranks.

Preferably, the platforms constituting each car supporting set are mechanically separated and the apparatus for shifting them along the ranks and for transferring them between the ranks is so arranged that the component platforms of each set are moved synchronously so that their relative positioning remains substantially constant.

According to a preferred form the platforms are so arranged that the cars supported thereby are disposed longitudinally of the ranks and the cars are each supported by two platforms, the front wheels being supported by one platform and the rear wheels by the other platform.

The apparatus may be automatically controlled so that the various movements are effected in a recurring sequence so as to circulate the cars until a control member has been moved to an "off" position or until a preselected number of cycles of movement have been performed.

In carrying out the invention the platforms may be provided on the underside with rollers running on fixed rails extending along the ranks or alternatively the platforms may run on fixed rollers distributed along the ranks, and the platforms may be provided with depending lugs or pillars at or adjacent their corners, which pillars are adapted to support the platforms independently of the rank supports during transverse movement between the ranks, the platforms being located above the floor, which is provided with grooves to accommodate the pillars during movement along the ranks and during transverse movement between the ranks.

Such a construction possesses the advantage that excepting at the ends of the ranks where certain constructions may necessitate recessing for the transverse movement the floor is practically continuous and is broken only by the grooves which may be quite narrow, whilst furthermore, this construction provides for surface drainage of the floor.

The transverse movement is preferably effected by laterally movable carriage apparatus on which the platform pillars are adapted to rest so as to support the platforms. Loading may be effected either by lowering the end supports until the pillars rest on the carriage apparatus or by raising the carriage apparatus so as to engage the pillars and lift the platforms clear of the rank supports and unloading may be performed by complementary movements.

In order that the invention may be more clearly understood reference will now be made to the accompanying drawings, wherein Figs. 1–3 show diagrammatically examples of layouts of a unit for storing cars.

Fig. 5 is a pictorial view of the centre portion of a storage unit with part of the floor broken away to show the mechanism.

Fig. 6 is another pictorial view of the end of a unit in which the floor is also broken away to show the mechanism. The view shows the west end of the unit shown in Fig. 1.

Fig. 7 is a plan view of a portion of the end of the unit shown in Fig. 6 with the floor and platforms removed.

Fig. 8 is a vertical section on the line VIII—VIII of Fig. 7, but with the platforms placed in position, and Fig. 9 is a vertical section on the line IX—IX of Fig. 7 also showing the platforms in position.

Fig. 10 is an enlarged sectional view taken on the line X—X of Fig. 7.

Fig. 11 is a sectional view taken across the unit at a point midway between the centre and one of the ends.

Fig. 12 is a detailed view drawn to an enlarged scale and showing an alternative form of the construction illustrated in Fig. 11.

Fig. 13 shows how the construction shown in Fig. 12 can be modified at the centre of the unit.

Fig. 16 shows a plan of a car park, and

Fig. 17 is a table showing the movements required to circulate the cars in either direction and around the unit, shown in Fig. 16.

Fig. 20 is a perspective view of a detail showing a limit switch actuated by the elevator movement.

Fig. 21 is another perspective view showing how the limit switches are actuated by the rank shifting mechanism.

Figure 1:
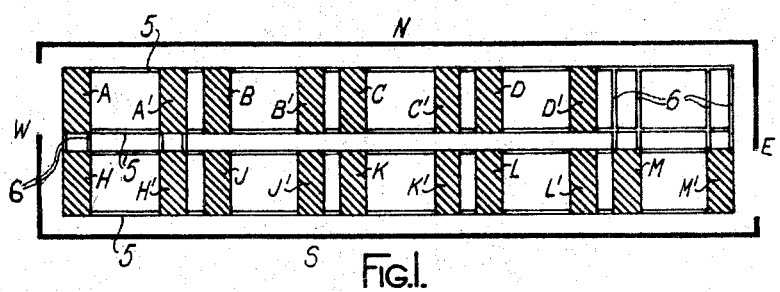

Referring first of all to Fig. 1, the unit is, for purposes of description, assumed to be arranged in an east and west direction, the platforms being arranged in two ranks side by side. These ranks will be referred to as the north rank and the south rank respectively. It will be observed that the unit is surrounded by a wall with inlets at the north-west and south-east corners, and normally one of these would constitute the entry position and the other the exit position. For purposes of description it will be assumed that the south-east corner is the entry position and the north-west corner the exit position.

The unit shown has provision for storing nine cars, the cars being arranged longitudinally of the unit and facing west. Each car is supported by two platforms, of which one supports the front wheels and the other the rear wheels. Thus the platforms A, A' would constitute a set and would together support a car, the front wheels resting on the platform A and the rear wheels on the platform A'. Similarly the platforms B, B' would support another car. When it is desired to place a car in the unit the sets of platforms will be circulated until a vacant set of platforms is opposite the entry, that is to say in the south-east corner position. As shown, the north-east position is vacant of platforms, it being necessary to leave one corner position vacant to permit of the circulation of the platforms. The platforms are circulated by alternately shifting them along the ranks and transferring them between the ranks. Thus, supposing the cars are to be circulated in a clockwise direction, the north ranks of platforms, together with the cars supported by them, would be moved eastwards through one car distance so that the platforms D, D' now occupy the north-east corner; this will leave a vacancy at the north-west corner. The platforms H, H' will now be transferred northwards into the north-west corner; this will leave a vacancy in the south-west corner. The south rank will now be moved westwards so that when the platforms J, J' occupy the south-west corner there is a vacancy at the south-east corner. Finally the platforms D, D', which it will be remembered are at present in the north-east corner, are moved southwards so that they occupy the south-east corner. The above described movements constitute one cycle and it will be observed that they have the effect of shifting all the sets of platforms, and the cars supported by the platforms, around the unit through one car position whilst still leaving a vacant space at the north-east corner. By successive repetition of this cycle the platforms may be circulated until the desired positioning is obtained.

As mentioned above, when placing a car in the unit this circulation is continued until an empty set of platforms is brought into the south-east entry position, whilst when it is desired to take a car out of the unit the platforms will be circulated until the car it is desired to remove is located in the north-west or exit position.

Figure 2:
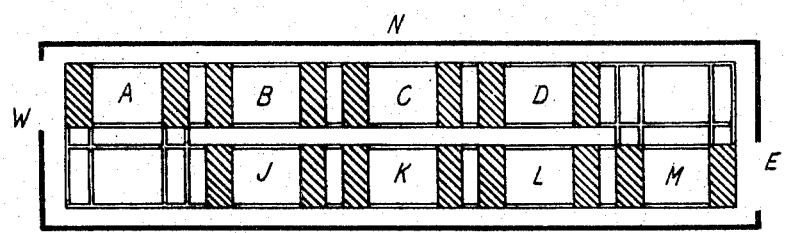

Fig. 2 shows an arrangement which is similar to that shown in Fig. 1 excepting that two vacant spaces are provided, namely at the south-west and north-east corners. With this arrangement the two ranks may be moved simultaneously in opposite directions and similarly transfer may take place at the two ends in opposite directions. Thus, in order to circulate the cars in a clockwise direction, as described above, the north rank would be moved eastwards and simultaneously the south rank would be moved westwards. The platforms D will now occupy the north-east corner and the platforms J will occupy the south-west corner, there being vacancies at the north-west and south-east corners. The next movement will be to move the platforms J northwards and simultaneously the platforms D southwards; there will then again be vacancies at the north-east and south-west corners as shown in Fig. 2. All the platforms, however, will be moved round one car position. Thus it will be appreciated that with the arrangements of Fig. 2 there are only two movements for each cycle, whereas in Fig. 1 there are four movements. Thus the Fig. 2 arrangement provides a more rapid circulation, but at the same time it is not so efficient as the Fig. 1 arrangement in utilisation of the available storage space, inasmuch as it is necessary to provide two vacant spaces instead of only one.

Figure 3:
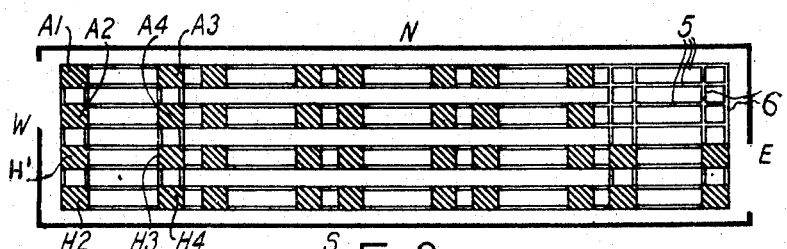

Fig. 3 shows a modified construction in which the arrangement is similar to that shown in Fig. 1 except that in this case there are four component platforms in each car supporting set, i. e. one platform for each wheel.

In the drawings references have only been given to the platforms A in the north-west corner. It will be observed that the platforms A1 and A2 will respectively support the front wheels of a car and the platforms A3 and A4 the rear wheels. The other sets of platforms are all similarly arranged.

Figure 4:
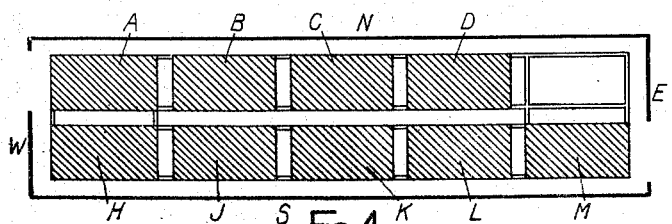
Fig. 4 shows an example of a layout suitable for either cars or goods.

Fig. 4 shows a construction employing a single platform for each car and with one vacant space. This arrangement is suitable for cars or for storing large articles such as packing cases in a warehouse. In the case of cars Figs. 1 and 2 show the arrangements which are usually preferred. The relative merits of the two-platform and four-platform types of equipment will be explained later.

Referring now to Figs. 5–10, which show a garage apparatus embodying the invention and incorporating the layout shown diagrammatically in Fig. 1, the platforms, which are also designated by the general reference 1, are provided with rollers 2 (Figs. 8–10) running on rails 3 extending along the ranks. The platforms are also provided with depending lugs or pillars 4, there being one pillar at each corner of each platform. The pillars 4 project downwardly into channels or grooves 5 in the floor which extend along the ranks. Transverse grooves 6 interconnect the grooves 5 of the two ranks at each end of the unit and accommodate the pillars during the transfer movements of the platforms between the ranks. The movement along the ranks is effected by rank shifting rods 7 which extend the length of each rank less one car position; the rods 7 carry fork members 8 which engage the pillars 4 of the platform. The rods 7 may be moved longitudinally of the ranks through a distance equivalent to one car position, this being the amount by which the platforms are moved each time. As will be explained subsequently provision is made for partially rotating the rods so that the forks 8 may be moved into operative positions during their return movements. The longitudinal movement of the rank shifting rod 7 is controlled from a rank shifting shaft 9 (Fig. 5) by means of a sprocket chain 10. Each end of this sprocket chain is attached to a collar or lug 11 mounted on the rod 7. The intermediate portion of the chain runs round a sprocket wheel 12 mounted on the shaft 9 and also around idler sprocket wheels 13. A short length of tubing 11a surrounds the rods 7 adjacent the points of attachment of the sprocket chains. This is for the purpose of preventing buckling of the rods under the pull of the chain. There are two rank shifting rods 7 for each rank so that a pillar on both sides of each platform is engaged; it is not necessary that all the pillars of a platform be engaged provided that one pillar on each side is engaged. In the arrangement shown the driving shaft 9 will extend right across the unit and will operate all four rank shifting rods, i. e. two for each rank, so as to move them simultaneously in one direction or the other. As, however, it will only be desired to move one of the ranks during such movement provision is made for rendering the rods operative or inoperative, and this is done by partially rotating the rods so that the forks 8 either extend in a horizontal direction and thus engage the pillars 4 of the platforms, or alternatively so that the forks 8 hang downwardly and thus can move along without shifting the platforms. For instance, in Fig. 11 the forks 8 are engaging the pillars 4 in the left-hand rank, but in the right-hand rank they are inoperative. The mechanism for changing over the positions of the rods, referred to herein as the phasing mechanism, is shown on the left-hand side of Fig. 6 and is also shown diagrammatically in Fig. 14. The rods are formed with square sectioned portions 14 at either end, and when the rods reach their extreme position of travel these square portions slide into sockets 15 which are rotatable, and each of which is provided with a crank arm 16 pivotally connected through links 17 with hydraulic servo-motors 18, 18'. As will be observed from Fig. 14, one socket 15 of each rank is operated by one of the servo motors and the other socket of each rank by the other servo motor.

The portions 14 are tapered at the ends to facilitate movement into the sockets.

Figure 14:
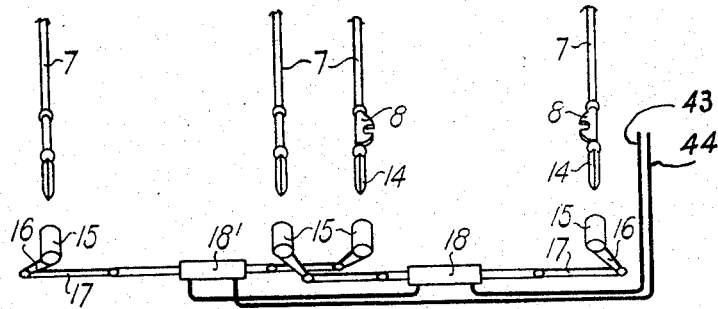
Fig. 14 is a somewhat diagrammatic perspective view showing the phasing apparatus at each end of a unit.

As will be seen from Fig. 14 the forks 8 in their operative positions point towards the centre of the rank with which they are associated, whilst in their inoperative position they hang downwardly and the arrangement employing the two servo motors is adopted on account of this. At intervals along their length the rods 7 are provided with spherical collar members 19. In the arrangement shown in Figs. 5, 8 and 11 these spherical collars are guided between the rail 3 and a guide member of angle section 20 so that each collar is located at three points but is, however, free to slide along the rail and angle member and also to rotate about the axis of the rod on which they are mounted.

In order to effect transfer of the platforms between the adjacent ends of the two ranks there is provided carriage apparatus which is movable transversely between the ranks, and mechanism is provided for lowering the platforms when in the end position so that the pillars 4 rest on the carriage apparatus.

Referring now to Fig. 6, the nearest car position is shown without any platforms, but supposing that the platforms 1(J) and 1(J') were moved to the left in the extreme position, the platform 1(J) would rest on the support section 21, referred to hereinafter as an elevator, and platform 1(J') would rest on the elevator section 22. These elevator sections 21 and 22 have rails 23 and 24 respectively constituting extensions of the fixed rails 3, and when platforms are resting on these elevator sections their wheels will be respectively supported by the rails 23 and 24. Provision, however, is made for lowering the elevator sections 21 and 22 so that the pillars 4 of the platforms will rest on carriages 25, 25'. The two carriages 25 support one side of the platform whilst the two carriages 25' (see also Fig. 7) support the other side. The carriages 25 are interconnected by a link 27 and the carriages 25' are interconnected by a link 27'. The carriages carry rollers 26 running on rails 28, 28', which rails in the example shown are constituted by girders of H-shape cross-section (Fig. 10), and the carriages are guided on the rails by vertically pivoted guide rollers 26a.

In Figs. 6 and 7 the carriages are in the south-west position of Fig. 1, but they are movable across to the north-west position, i. e. the left-hand position of Fig. 7, and in so doing they would carry the platform with them, it being assumed, of course, that at such time the platforms 1(A) and 1(A') shown in Fig. 6 will have moved away from the north-west position.

The drive for moving the carriages 25 and 25' along the rails 28 and 28' is obtained from an electric motor WM coupled, for instance, through worm gearing with a transfer shaft 30 which in turn drives sprocket chains 31 and 31' respectively connected to the two pairs of carriages. The sprocket chains 31 and 31' pass around sprocket wheels 32 and 32' keyed on the shaft 30 and are caused to wrap around these sprocket wheels by means of idler sprocket wheels 33 and 33'.

It will be appreciated that the mechanism described is that for moving one platform, i. e. the end platform, and that a similar mechanism will be provided for moving the complementary platform of the end set, that is for moving a platform located on the elevator section 22 into the position occupied by the platform 1(A') shown in Fig. 6. In such a case the carriage apparatus will be similarly driven by sprocket chains which are also passed around sprocket wheels mounted on the transfer shaft 30.

As previously mentioned, for the purpose of loading the platforms resting on the elevator sections 21 and 22 on to the apparatus, provision is made for lowering these elevator sections, and the mechanism for doing this is shown in Figs. 9 and 10.

The elevator section 21 is, of course, the same member that is shown in Fig. 6, whilst the support section 34 will be located under the platform 1(A) as shown in Fig. 9. As may be seen more clearly from Fig. 9 the support sections are formed of a flat top with an overhanging flange and with a downwardly depending flange, the two flanges which lie transversely, i. e. laterally, of the ranks, are formed with cam edges 35 which rest on rollers 36. The rollers 36 are in their turn mounted coaxially with rollers 37 running on short rails 38.

It will be observed that all those rollers which are in alignment laterally are interconnected by link members 39, 39' extending laterally across the unit.

Each of these links is formed of spaced side members (Fig. 7) separated by spacing blocks 39a, 39'a.

Each elevator section is formed with four cam edges and the rollers associated with the links 39 support the cam edges along one side of each of the end support sections, whilst those rollers associated with the links 39' support the opposite edges of the same pair of sections. This will readily be appreciated from Fig. 7.

In the arrangement shown in Fig. 9, the support sections 21 and 34 are in their raised positions so that the platforms are resting on them. If, however, the links 39 and 39' are moved to the right the rollers 36 will run along the cam edges 35 so that the elevator sections 21 and 34 will be lowered, and the arrangement is such that when they are lowered the pillars 4 will rest upon carriage members 25 and 25'.

At the positions in which the pillars 4 occur in the case of platforms resting on the elevator sections the guides 20 are broken so that the pillars 4 may pass down through the gaps to rest on the carriage members. This arrangement is shown best in Fig. 7.

The transverse movement of the links 39, 39' is produced by hydraulic servo motors 49 (Fig. 15) of which the motor 41 operating the link 39 is shown in Fig. 6, the motor 49 operating the link 39 and this link itself being concealed from view in Fig. 6 beneath the left-hand end of the carriage. The pistons of the servo motors are connected to the spacing blocks 40, 39a, 39'a. In Figs. 7 and 9 the links and spacing blocks are shown but the servo motors are omitted; it will be understood, however, that they will be located between the two sides of each of the links.

Whilst Fig. 9 and Fig. 10 show the apparatus for the elevator sections 21 and 34 only, it will be appreciated that a similar apparatus is provided for the section 22 and also the opposite elevator section which will lie underneath the platform 1(A) as shown in Fig. 6 and the operation of this will be co-ordinated with the mechanism for raising and lowering the elevator sections 21 and 34, so that all four elevator sections at an end of the unit will be raised and lowered simultaneously. To this end all four servo motors at either end of the unit may be connected in series as regards the hydraulic circuit, and this circuit may contain a hydraulic generator by which they are controlled, as will be explained in due course with reference to the control mechanism for the storage unit.

From the arrangement described, it will be appreciated that the operation of transferring a pair of platforms between the two ranks consists in first lowering all four elevator sections so that the platforms to be transferred rest on the carriages, and then moving the carriages transversely from the one rank to the other rank and, finally, raising the elevator sections so that the platforms are raised from the carriages into the new rank. The elevator positions between which the carriages travel are also referred to sometimes as transfer positions.

In the arrangement shown in Figs. 8 and 11 the rank shifting rods 7 are placed on the inside of the pillars 4, and the rails 3 supporting the platforms project outwardly from the floor structure F. Fig. 12 is a modified arrangement in which the rank shifting rods 7 are located on the outside of the pillars 4, and this arrangement has the advantage that the rails 3a can rest on the top of the floor structure 42 so that the weight of the trucks is borne directly by the floor structure. In this case, also, the guide member 20 is replaced by a guide member 20a in which the horizontal flange is on the top instead of the bottom.

Fig. 13 shows how the Fig. 12 construction is modified at the centre of the unit to allow for the rank shifting chain 10. It will be observed that the flange of the guide member 20a is widened and that beneath this flange rollers 43 are provided over which the sprocket chain 10 will run.

Phasing (to change over the rank shifting drive from one rank to the other) is effected during transverse movement of the carriages and the cylinders 18, 18' are operated by pumps controlled by the carriage actuating apparatus.

Figure 15:
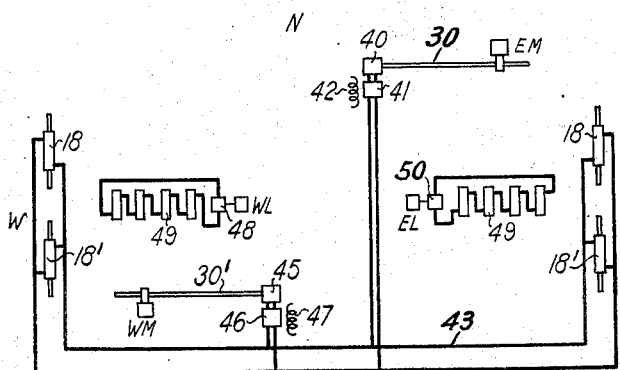
Fig. 15 shows diagrammatically the hydraulic connections involved.

Fig. 15 shows the hydraulic connections involved. It will be observed that the phasing cylinders 18, 18' at both ends of the unit are connected with the hydraulic mains 43, 44 either in series (Fig. 14) or in parallel (Fig. 15) so as to be actuated substantially simultaneously. The carriage motor for effecting transverse movement at the east end is indicated by the reference EM and this is coupled through gearing to the shaft 30 to which there is also coupled a pump 40. The pump 40 is coupled to the shaft 30 through a conventional free wheel or other unidirectional device so that the pump is only operated during rotation of the shaft 30 in the one direction and is unaffected when the shaft is rotating in the opposite direction. This arrangement is necessary since each traversing operation (occurring between consecutive rank shifting operations) involves a double carriage movement, i. e. a movement in one direction unloaded and a movement in the opposite direction loaded and the phasing action is required to be effected once only between any two consecutive rank shifting operations. The pump 40 is connected through a changeover valve 41 with hydraulic mains 43 and 44. The changeover valve has the effect of reversing the connections between the pump and the hydraulic mains 43 and 44 so that the phasing action may be reversed with the direction of circulation of the platforms. The valve 41 is biased to one position and is moved to the alternate position by an electromagnet 42. Thus, in one direction of circulation one of the carriage movements (N or S) of each traversing operation will be accompanied by a phasing action to engage the shifting rods of one rank and disengage the rods of the other rank, while in the other direction of circulation the same movement will be accompanied by phasing in the reverse sense (see diagram Fig. 17). It is immaterial which of the carriage movements (N or S) is accompanied by phasing action since both movements occur during the interval between two consecutive rank shifting operations. In one direction of circulation this movement will be the idle and in the other the laden travel of the carriage.

Similarly, traversing at the west end of the unit, carriage movement is effected by a motor WM coupled to a shaft 30' which in turn is also coupled to a pump 45. The pump 45 is connected to the mains 43 and 44 through a changeover valve 46 which in turn is operated by an electromagnet 47. It will be appreciated that only one of the pumps 40 and 45 will be operative at any one time, the other being dead and without effect upon the movement of pressure fluid through the hydraulic system. The changeover valves 41 and 46 may be of any known rotary or sliding type biased by spring action into one of two alternative settings and adapted to be moved against spring action into the other setting by means of an armature coacting with the coils of the respective electromagnets 42 and 47. The circuit connections of the coils of the electromagnets 42 and 47 are shown at the top of Fig. 19b and will be referred to at a later stage in the description of the operation of the electric control system. The electromagnets 42' and 47 are unexcited during circulation of platforms in the one direction around the unit but are energised during circulation in the reverse direction.

The elevator apparatus at the west end is controlled by a motor WL which operates a pump 48 feeding the four hydraulic cylinders 49 actuating the elevator mechanism. These hydraulic cylinders, one of which is shown in Fig. 6, are connected in series in the hydraulic circuit. Similarly at the east end the elevator hydraulic cylinders 49 are operated from a pump 50 driven by an electric motor EL.

Electric control apparatus for effecting automatic operation of a unit will now be described. Fig. 16 shows an arrangement of a unit in which there is a common loading and unloading position at the north-east corner PI. The platform positions are indicated by the references PI—P9 and it is emphasized that these references refer to the fixed positions as distinguished from the platforms themselves which are referred to in connection with Figs. 1-4. The position at the south-east corner is always vacant at the end of a cycle of movements; a cycle of movements being such that if circulation takes place in a clockwise direction, the set of platforms in the position P2 will be at the loading and unloading position PI at the end of the cycle. Thus four cycles will be needed to bring the platforms in position P5 to the loading and unloading position. If circulation occurs in a counter-clockwise direction one cycle of movement will bring the platforms in position P9 into the PI position. If it is desired to bring a platform in the north rank into the loading and unloading position, the circulation takes place in a clockwise direction, whilst to bring a platform in the south rank into the loading and unloading position circulation takes place in a counter-clockwise direction. The vacant space at the south-east corner also occurs at the end of each cycle of movements during circulation in either direction.

Figure 18:
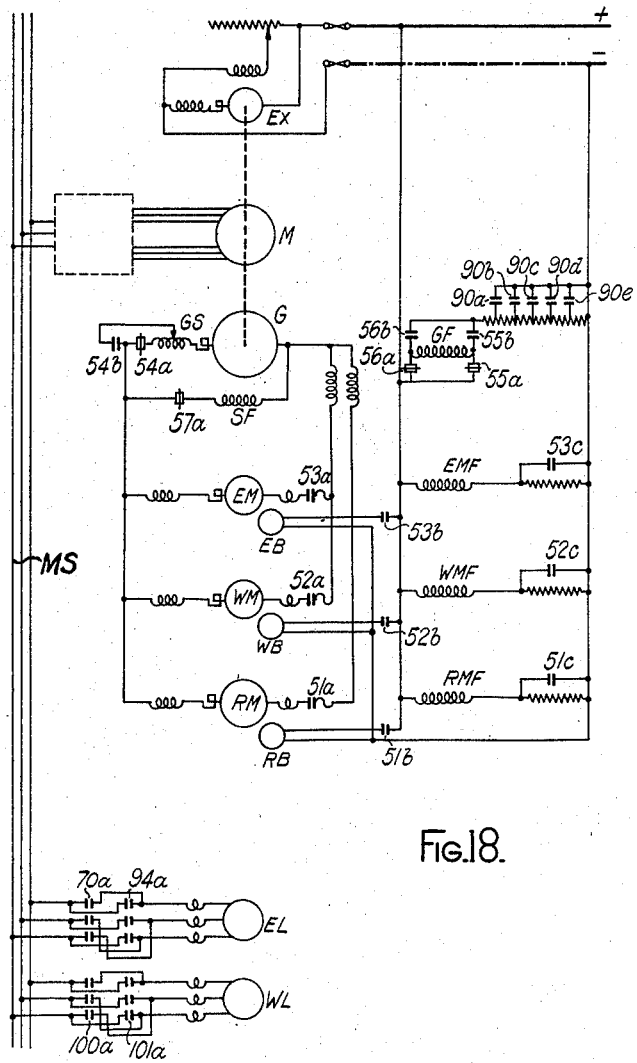
Fig. 18 is a schematic showing the main circuits of apparatus for automatically effecting the sequence tabulated in Fig. 17, and Figs. 19a and 19b together constitute a schematic showing of the control circuits employed in conjunction with Fig. 18, it being intended that Figs. 19a and 19b should be placed together, side by side.

In Fig. 18, which shows the main electric circuit, the supply is obtained from three-phase alternating current supply mains MS, the elevator motors WL and EL are alternating current induction motors preferably designed to have a high starting torque and are fed directly from the mains through reversing contactors. The motor for effecting rank movement, i. e. for moving the rods 7 to shift the platforms along a rank is indicated by the reference RM whilst EM is the motor for moving the carriage at the east end and WM the carriage motor at the west end. The motors RM, WM and EM are controlled on the Ward-Leonard principle and are fed from a generator G mechanically coupled with a motor M fed from the three-phase supply mains MS. The motor M also drives an exciter EX supplying low voltage direct current to positive and negative busbars for the various field windings and the control apparatus. In Figs. 18 and 19 the low voltage positive busbar is indicated by a continuous thick line and the low voltage negative busbar by a thick chain line.

The motors RM, WM and EM are compound wound and are provided with series windings and with separately excited windings RMF, WMF and EMF respectively. The motor RM is connected with the generator G through a contactor 51a. Similarly the motor WM is connected through a contactor 52a and the motor EM through a contactor 53a. Resistances are included in series with the separately excited fields and when the motors are started up these resistances are cut out by contacts 51c, 52c, 53c respectively.

The generator G is also compound wound and is provided with a series field GS and a separately excited field GF. The series winding GS is connected in the main circuit through normally closed contacts 54a; in order, however, to reduce the voltage of the generator the contacts 54a may be opened and 54b closed, this reduces the amount of series field winding in the circuit and enables the generator voltage to be reduced for effecting a slowing down at the end of a rank or a carriage movement.

Pairs of contacts 55a, 55b, and 56a, 56b are provided for reversing the direction of current flow through the separately excited generator field GF. Of these pairs of contacts it will be observed that 55a and 56a are normally closed and 55b and 56b are normally opened. When contactor coil 55 (Fig. 19a) is excited the generator field will be supplied with excitation current in the one direction whilst when contactor 56 is operated the generator field GF will be excited in the opposite direction. The generator is also provided with a suicide field SF which is connected across the armature through normally closed contacts 57A and the purpose of which will be described in due course. The motors RM, EM and WM are provided with brakes RB, EB and WB, the shoes of which act on the shafts connected to the respective motors. The brakes are of such kind that when energised they are held in the "off" position and when de-energised they are allowed to go on.

Figure 19A:
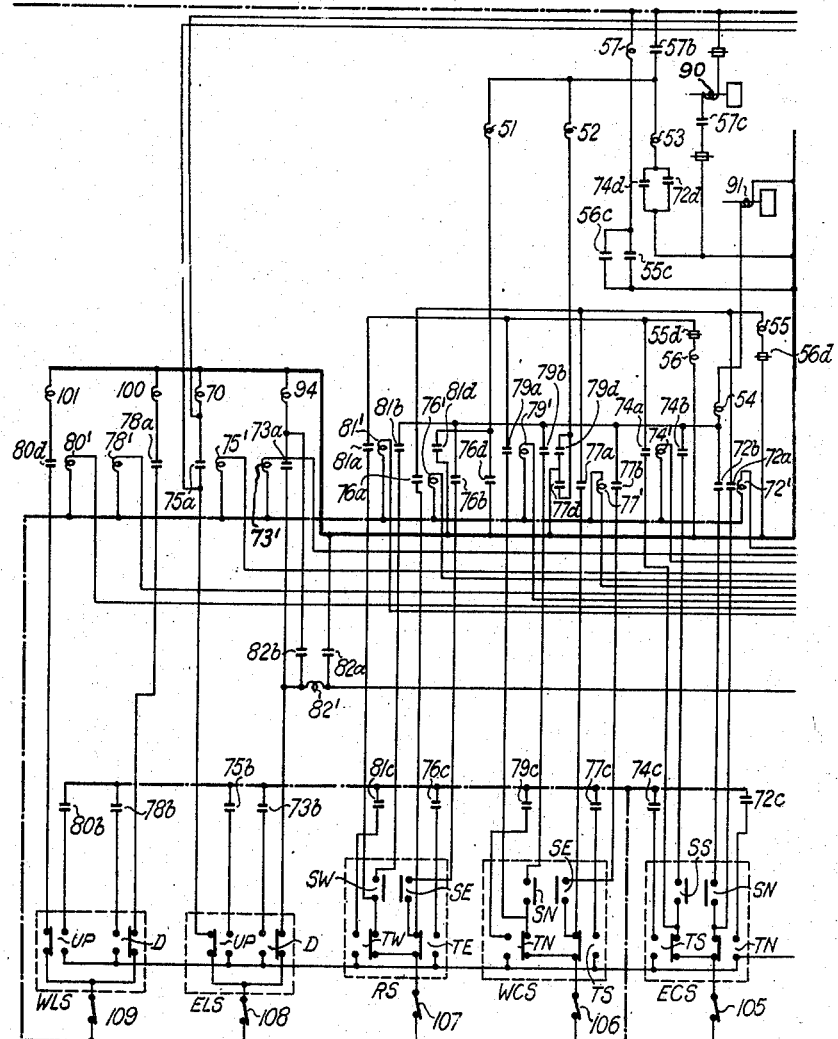
Figure 19B:
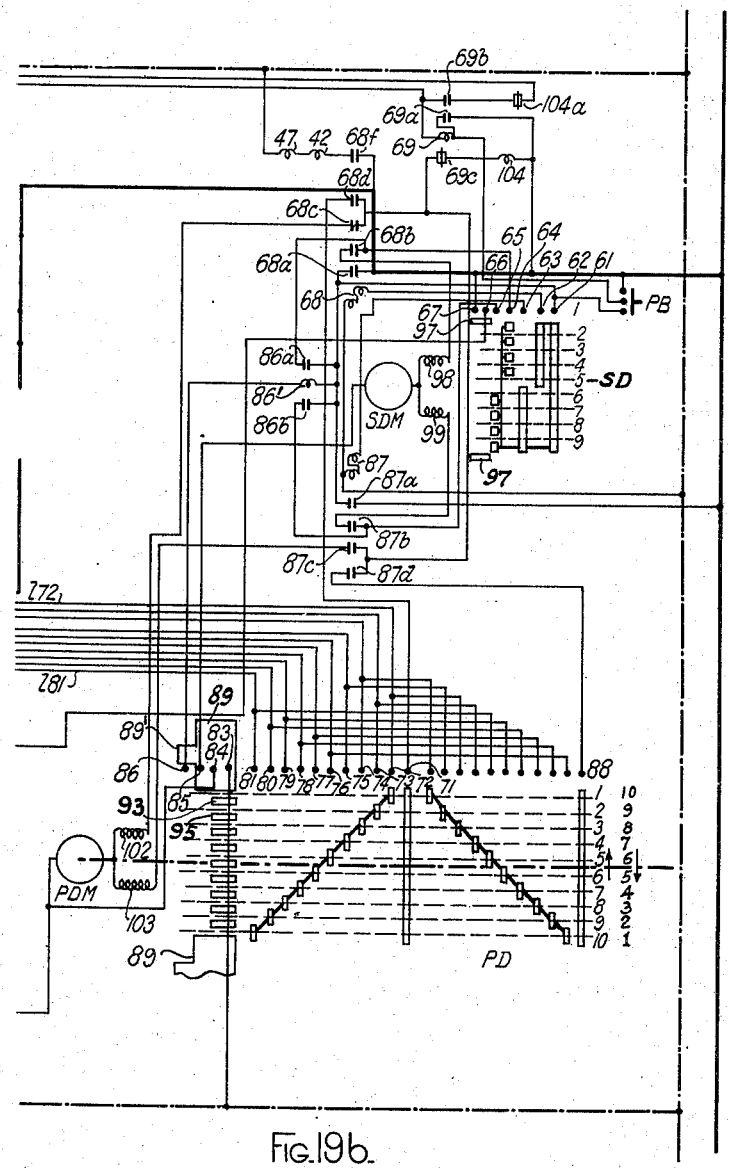

Referring now to Figs. 19a and 19b, the reference SD indicates generally the selector drum. This has nine positions corresponding to the platform positions P1—P9 in Fig. 16, the position 1 being the "off" position. The arrangement of the selector drum is such that if the fingers are moved into any of the selecting positions the cars will be circulated until the set of platforms occupying in the position selected is brought to the unloading and loading position in the north-east corner. The selector drum is rotated by a pilot motor SDM. Associated with the segments on the selector drum are contact fingers 61—65 and auxiliary contacts 66 and 67, all the contacts are mounted on a carrier which is movable into any of the positions 2–9, the number 1 position being the "off" positions.

PD is a pilot drum which controls the sequence of platform movements. The drum has ten operative positions and an "off" position, the ten operative positions corresponding to ten movements. At the conclusion of each movement the drum is stepped forward to the next position by the motor PDM when the drum again remains stationary until this movement in turn is finished. One revolution of the pilot drum corresponds to one cycle of movement and at the end of a revolution the selector drum is moved back one position until eventually the fingers arrive back in the number 1 position as shown in the drawings. If one of the positions 2, 3, 4 or 5 is selected, finger 62 will be effective and as will be explained this will energise relay 68 and render the lower half of the pilot drum operative, moreover, the latter will be moved to the left relatively to the fixed contact fingers. If on the other hand, a position 6, 7, 8 or 9 is selected on the selector drum, finger 63 will be engaged and this will energize relay 87 and render the top half of the pilot drum operative, moreover, in this case the pilot drum will move to the right relative to the contact fingers the reversal of movement being effected by differential field windings 102 and 103 on the motor PDM. In the same way the selector drum motor SDM has differential windings 98 and 99 and these rotate the drum in one direction for positions 2, 3, 4 or 5 and in the reverse direction for positions 6, 7, 8 or 9.

The stepping forward of the pilot drum PD at the conclusion of each operation is effected by limit switches. Thus a bank of switches ECS is associated with the east carriage and during movement northward a slow-down limit switch SN is closed towards the end of the movement, and at the end of the movement a stop limit switch TN is changed over so that the lower contacts are opened, and the upper contacts closed, the switch TN remains in this position until the carriage moves away from the north end of its travel, switches SS and TS perform the same functions during southward movement of the carriage. Similar banks of switches WCS and RS are associated with the west carriage and rank movement whilst ELS and WLS are associated with the east and west elevators.

The operations of the described storage equipment to be carried out automatically by the described control mechanism will now be described in detail in the order in which they are performed to effect a clockwise circulation of the platforms. As an aid to following this description, the sequence of operations will first be enumerated summarily (see diagram of Fig. 17), it being assumed that a selected platform or set of platforms is to be brought into a loading and unloading position at the south-east corner of the unit (Fig. 16). The operations are then as follows:

A. Preliminary operation: raising E elevator (to raise platforms at P1 from loading and unloading position) prior to sequence of cycles.

B. Repeatable cycle comprising ten operations (corresponding to positions one-ten of pilot drum PD denoted by numerals "1"–"10" in Fig. 19b), viz.:
  (1) Traversing E carriage idle northwards.
  (2) Lowering E elevator.
  (3) Traversing E carriage laden southwards.
  (4) Raising E elevator.
  (5) Shifting N rank eastwards.
  (6) Traversing W carriage idle southwards.
  (7) Lowering W elevator.
  (8) Traversing W carriage laden northwards.
  (9) Raising W elevator.
  (10) Shifting S rank westwards.

C. Concluding operation: Lowering E elevator (to lower platform at P1 into loading and unloading position) after sequence of cycles.

The number of repetitions of cycle B will of course depend upon which of the platforms or sets of platforms is selected.

Assuming the selector drum fingers have been moved to select a platform in one of the positions 2, 3, 4 or 5 (Fig. 16), the push-button PB is pressed, this will energise the relay coil 68, the circuit passing from the positive busbar through the switch PB, the studs 61 and 62 and the coil 68 back to the negative busbar. Contacts 68a are holding contacts and maintain the coil 68 energised independently of push-button PB so long as the contacts 61 and 62 are on their corresponding segments.

As will be explained subsequently, at the end of each selected sequence of cycles of operations the elevators at the east end are lowered so as to leave a flush floor and enable a car to be driven off or driven on to the platforms at the loading and unloading position in the north-east corner. Accordingly, upon initiating a new sequence of cycles to another set of platforms into the loading and unloading positions the east elevators must first be raised before the new sequence proper takes place. This preliminary operation is effected by the centre contact of the push-button PB which energises the coil 69 which immediately locks itself in through the holding contacts 69a, whilst at the same time the closure of the auxiliary contacts 69b energises the contactor coil 70 and this by closure of contacts 70a (Fig. 18) connects up the EL motor in such a direction as to raise the east elevators.

At the end of the movement the up limit switch of the bank ELS is operated by contacts associated with the elevator so that the upper pair of contacts are opened and the lower set of contacts are closed. Opening of the lower set of contacts breaks the circuit through the operating coil 70 and stops the elevator motor EL and at the same time it breaks the circuit through the relay coil 69. Normally closed contacts 69c will now reclose and connect the positive supply through the contacts 68d with the pilot drum contact 71. The lower half of the pilot drum (shown on the left in the developed diagram of Fig. 19b) will then be rendered operative and thus effect a cycle of movements such as to circulate the platforms in a clockwise direction.

This will be the case since the positive busbar has been connected through contacts 68c with the field winding 102 of the pilot drum motor, the lower side of which motor is connected to the negative busbar through the large segment 89 and the contacts 83 and 84. The pilot drum motor will then rotate from "off" or number one position until it is in the number two position when the circuit through it will be broken by the contacts 83 and 84 leaving the segment 89.

When the pilot drum motor comes to rest in number one position the contact finger 72 will be engaging its corresponding segment and so a connection from the positive busbar is made to energise the sequence relay coil 72'. Closure of contacts 72a energizes generator field contactor coil 55 opening switches 55a and closing switches 55b (Fig. 18) and thus connecting up the generator field GF in the correct direction. The circuit for coil 55 passes through the lower contact of the limit switch TN of the bank ECS which operates for northward movement of the east carriage. Closure of auxiliary contacts 55c energises the suicide contactor coil 57, open-circuiting the suicide field winding SF by means of normally closed contacts 57a (Fig. 18).

At the same time closure of auxiliary contacts 57b energises relay coil 53, this being possible as the contacts 72d are closed at this time; energization of coil 53 closes contact 53a (Fig. 18) connecting up the east carriage motor EM with the generator, whilst contacts 53b release the brake EB and contacts 53c shut out the resistance in series with field winding EMF. Closure of contacts 57c completes the circuit through a time delay contactor 90. This contactor which is indicated diagrammatically and may be of any known type, for instance embodying an escapement device, has the effect of closing in sequence at predetermined intervals the cascade connected contacts 90a–90e (Fig. 18) thus progressively increasing the excitation current through the separately excited generator field GF.

Thus, the east carriage motor EM is started up and moves the carriage in a northward direction. This movement it will be remembered moves the carriage from its resting place in the south-east corner into position beneath the platforms in the north-east corner. Towards the end of the movement the slow-down contacts SN of the east carriage bank ECS are closed, this energises contactor operating coils 54 and 91. Contactor 54 has contacts 54a and 54b (Fig. 18) which when actuated reduce the amount of series field winding GS in circuit with the generator, as previously explained. Contactor 91 which is also shown diagrammatically is similar to and intercoupled with the contactor 90 and has the effect of consecutively opening the contacts 90e—90a (Fig. 18) so as progressively to reduce the strength of the generator field GF.

Northward movement of the east carriage is arrested when the stop limit switch TN is actuated, so as to open the lower contacts and close the upper contacts; opening the lower contacts TN breaks the circuit through relay coil 55, thus closing contacts 55a and opening contacts 55b (Fig. 18) and cutting off the generator field GF, opening of contacts 55c open circuits the suicide contactor coil 57 and the suicide field SF is thus reconnected across the generator. Opening of contacts 57b open-circuits the contactor coil 53 so that contacts 53a (Fig. 18) open, cutting off the east transverse motor EM. Contacts 53b will also open applying the brake EB to the shaft of the east carriage motor EM. Closure of the upper TN contacts completes the circuit for the pilot drum motor PDM, the circuit passing from the positive busbar through the contacts 69c and 68c to the upper end of the field winding 102 and from the lower end of the motor PDM through the contacts TN and 72c to the negative busbar.

The motor PDM will then rotate the pilot drum towards the number two position; after a slight movement contacts 83 and 84 will engage the segment 93 and this will complete a circuit between the negative busbar and the pilot drum motor PDM independently of the contacts 72c so that the pilot drum motor will continue rotating until the contacts 83 and 84 leave the segment 93 when the pilot drum will come to rest in the number two position.

At this time it will be appreciated that the contact finger 72 will have left its associated segment so that the contacts 72c will be open and the pilot drum motor will no longer be connected with the supply through contacts TN.

In position number two the finger 73 on the pilot drum is engaged by its associated segment and this energizes the sequence relay 73', closure of contacts 73a energizes east elevator contactor coil 94, closing contacts 94a (Fig. 18) which connect the east elevator motor EL so as to lower the elevator. This loads a set of platforms on to the carriage in the north-east, i. e., P1 position.

At the end of the elevator movement the moving contact of limit switch D of switch bank ELS is moved downwardly so as to open the upper contacts D and close the lower contacts D. Opening of the upper contacts D open-circuits the contactor coil 94 cutting off the elevator motor EL from the A. C. mains, whilst closure of the lower set of contacts D again completes a circuit for the pilot drum motor PDM which rotates the pilot drum so that the contacts 83 and 84 engage segment 95, the movement then continuing until contacts 83 and 84 leave segment 95 when the pilot drum is in number three position. The contacts 73b at this time open the motor circuit through the lower set of contacts D.

The next cycle is to move the loaded east carriage from the north-east corner to the south-east corner of the unit. In the position three of the pilot drum the finger 74 is engaging its segment on the sequence drum and sequence relay coil 74' is then energized. Contacts 74a close and energize contactor coil 56, this operates contacts 56a, 56b (Fig. 18) connecting up the generator field GF. Contacts 56c energize the suicide contactor 57 and this in turn through closure of 57b energizes the contactor coil 53 connecting up the carriage motor WM and releasing the associated brake. The circuit through contactor 53 being completed since contacts 74d are closed at this time. This operation it will be appreciated is exactly the same as the operation associated with position 1 of the pilot drum in which the carriage was moved northwards, excepting that in this case contactor 56 is operated instead of contactor 55 so that the generator voltage is reversed and hence the carriage motor rotates in the reverse direction. Slowing down in this case is effected through closure of the SS contacts of the ECS bank and stopping by downward movement of the armature of the contacts TS.

In position four of the pilot drum contact finger 75 is energized and hence sequence relay 75'. Contacts 75a energize contactor 70 closing contacts 70a (Fig. 18) and connecting up the elevator motor at the east end to raise the elevator and unload the carriage.

In position five of the pilot drum all the trucks in the upper rank are moved eastwards, this means that both sets of rods 7 are moved eastwards, those in the upper rank being operative and those in the lower rank inoperative. This cycle of operations is initiated by contact finger 76 engaging its associated segment on the pilot drum thus energizing relay 76' and is the same as for movement of the east carriage excepting that contactor coil 53 is not energized and instead contactor coil 51 is energized through contacts 76d. Contacts 76a energize relay coil 55, this as above explained connects up the generator field GF and also through its auxiliary contacts 55c energizes the suicide contactor 57 and cuts out the suicide field whilst contacts 57c energize the accelerating relay 90. Contacts 76b energize contactor 51 which through its contacts 51a (Fig. 18) connect up the rank movement motor RM and releases the associated brakes RB by way of contacts 51b. The movement is then the same as for the carriage movement, slowdown being effected in this case by closure of contacts SE of bank RS. The stopping being effected by movement of the armature of the limit switch TE so as to open the lower contacts and close the upper contacts.

In number six position the west carriage is moved unloaded across from its resting place in the north-west position to the south-west position. This movement being controlled by contact finger 77 of the pilot drum and sequence relay 77'. The movements of the elevator at the west end are exactly the same as those of the elevator at the east end excepting that the contactor coil 52 is energized through contacts 77d and contactor 52a is operated to start motor EM, the generator field contactor 55 being in this case energized by the closing of contacts 77a to obtain the required direction of current flow in GF. Following the table of Fig. 17 it will be observed that in position seven of the pilot drum, contact finger 78 is energized and relay 78' is operated, this effects downward movement of the west elevator. In position eight the sequence relay 79' is operated to effect northward movement of the west carriage, the generator field relay 56 being in this case operated through contacts 79a. In the next position (nine) of the pilot drum, contact finger 80 closes a circuit through sequence relay 80' thereby closing contacts 80d and energizing contactor 101 to start up motor WL which then raises the West elevator. When the pilot drum is in position ten, sequence relay 81' is operated and this effects rank movement in a westward direction of the platforms in the south rank, and in this case generator field contactor 56 is operated. At the end of a cycle of movements the pilot drum will have made a complete revolution and the contact fingers 83 and 84 will again engage the segment 89 so that the pilot drum will be moved forward once again to the No. 1 position when the described sequence of cycles will be repeated. During the movement of the contact fingers 83 and 84 across the segment 89 the contact 85 also engages the segment 89 and connects the lower side of the selector drum motor SDM with the negative busbar whilst the segment 89 is also formed with a downward extension 89' which temporarily engages the contact 86, this will energize the relay 86' and closure of contacts 86a will connect the upper end of the field winding 98 of the selector drum motor with the positive busbar; it will be remembered that contacts 68a are at this time closed. This will move the selector drum until the contact finger 64 comes on to the next adjacent small segment, when this happens movement of the selector drum motor will continue independently of the relay 86'. It will, of course, be appreciated that the width of the downward extension of segment 89 and the speed of movement of the drum must be such that the relay 86' is energized long enough to enable the contact fingers 64 to engage the segment. Furthermore, the selector drum should have reached the next position before the studs 83 and 84 leave the drum 89, that is before the pilot drum arrives once more in the No. 1 position. When the selector drum arrives back in the first position as shown in the drawings the circuit through the relay coil 68 will be broken so that this relay will fall out and by breaking the connection to the upper end of the field winding 102 of the pilot drum motor will prevent further operation of this motor. After the last cycle of a sequence it is desired to lower the elevator at the east end of the unit so as to leave a flush floor and this is effected by means of one of the segments 97 of the selector drum SD which when the latter moves to its initial position temporarily connects the contact fingers 66 and 67, these energize the relay coil 82' which immediately locks itself in through holding contacts 82a, at the same time contacts 82b energize the contactor coil 94 connecting up the east elevator motor to lower the elevators. At the end of the lowering movement the limit contacts D of the switch bank ELS break the circuit through coils 82 and 94 and thus stop the movement.

As previously mentioned when the selector drum is in any of the positions 2, 3, 4 or 5 and is moved by the pilot drum the contacts will move to the left relatively to the segments and in this case the relay coil 68 will be energized so that the lower half of the pilot drum is operative whilst due to closure of contacts 68b when the selector drum motor is energized the circuit will pass through the winding 98. Similarly, if one of the positions 6, 7, 8 or 9 is selected relay 87 will be energized and this will render effective the upper half of the pilot drum PD (shown on the right in Fig. 19b) and when the selector drum motor is energized it will be through the field winding 99, it being appreciated that the field windings 98 and 99 are oppositely wound to give reverse rotation.

Similarly the pilot drum motor has field windings 102 and 103 which are also oppositely wound to give reverse direction of rotation, the pilot drum being rotated in the opposite direction for positions 6, 7, 8 and 9, i. e. when relay 87 is operated.

As explained in connection with Fig. 15 the positions of the changeover valves 41 and 46 are reversed during alternate directions of circulation of the platforms. Normally they are biased so that they each assume the position for counter-clockwise circulation. During clockwise circulation, however, they are moved to the alternate positions by the electromagnets 42 and 47 respectively. These, which are also shown in Fig. 19b, are energized when the contacts 68f are closed. In order to ensure that the carriage raising apparatus shall not be operated by inadvertent operation of the push-button PB whilst the apparatus is in operation the circuit through contacts 69b by which the contactor coil 70 is energized includes normally closed contacts 104a; these contacts are actuated by the operating coil 104 which is in series with the normally closed contacts 69c. Thus, at the commencement of a selection operation when push-button PB is closed contacts 69c will be opened so that the coil 104 will not be energized and contacts 104a will consequently be closed. When the initial elevator raising movement ceases, however, the energizing circuit through coil 69 is broken, as previously explained, by the stop limit switch so that the relay 69 falls out. At this instant closure of contact 69c will energize the coil 104 and open contacts 104a so that it will not be possible to operate the elevator motor contactor 70 from the push-button PB until the selector drum has been moved back to the number 1 position. In addition, means are provided for preventing inadvertent movement of the carrier carrying the contact fingers 61—67 whilst the apparatus is in operation. This may be effected by a solenoid 105 (not shown) which operates a latch holding the contact carrier of the preselector device against rotation during such time as either relay 68 or relay 87 is energized, which will be, of course, until the preselector drum returns to the number 1 position. 105, 106, 107, 108 and 109 are overload switches controlled by overload coils of the main circuits of the east and west carriage motors, the rank motor and the east and west elevator motors respectively.

Fig. 20 shows how the stop limit switches of the elevators are actuated.

Referring again to Fig. 6, the links 39 are connected through a rod 110 (Fig. 20) with a pivotal lever 111 operating switch mechanism inside a switch box 112; 113 and 114 are stops limiting the movement of the lever 111.

Fig. 21 shows the corresponding stop limit switches employed for the rank movement motor.

Referring to Fig. 5, it will be observed that Fig. 21 shows the opposite side of the member 11 by which the sprocket chain is secured to the rod 7. The member 11 carries a laterally projecting pin 115 which is located between the two arms of a rocking U-member 116 mounted on a shaft 117 so that it actuates switching apparatus carried within a switch box 118.

Whilst the arrangement hereinbefore specifically described has been for a layout of the type described in Fig. 1, it will be appreciated that it may be readily modified for arrangements as in Fig. 3 wherein each automobile is supported by four platforms or for arrangements as in Fig. 4 wherein each automobile is supported by a single platform, which latter arrangement is, as above mentioned also applicable for use in equipments for storing articles other than automobiles. In the case of Fig. 3 it will be observed that there are four longitudinal grooves for each rank so that there will, of course, be four sets of rank shifting rods 7 for each rank, thus there will be eight sets of rods 7 in the unit all of which will be moved longitudinally. Similarly the carriage and elevator mechanisms will be modified and referring to Fig. 6 it will be appreciated that the elevator platform 21 as shown extends right across the rank. In the case of the four truck arrangement of Fig. 3 the elevator section 21 will be replaced by two elevator sections arranged so as to be disposed underneath the platforms in the end position; between the two elevator sections there may be fixed floor space. Each elevator section will be provided with elevator mechanism, the two mechanisms being interconnected by links so that they are actuated simultaneously, thus the links 39 may be extended and may carry four sets of cam plates 35 instead of two. Similar modifications will be made to the carriage apparatus. Whereas in Figs. 6 and 7 the carriage apparatus for each platform comprises four carriages, i. e. the two carriages 25 and two carriages 25', there will now be two additional carriages since the two small platforms which will now occupy this position will each be supported at their four corners by a carriage. Thus there will be eight carriages in all in this position; the four carriages on each side may be interconnected by links and all eight carriages will be moved synchronously. In the case of the Fig. 4 construction the floor space between the platform positions 21 and 22 (Fig. 6) will be removed and the two elevator platforms will be interconnected to form a single member. In the case of the carriage the apparatus between the elevator platform 21 and the intervening floor space above referred to, may be omitted as may also the carriage apparatus between the floor space and the elevator platform 22 since in each corner position it will now only be necessary to support four of the platform pillars 4. In the case of the arrangement of Fig. 2 in which there are two vacant positions, namely at diametrically opposite corners, it will be appreciated that, as above mentioned, the two ranks may be moved simultaneously in opposite directions, whilst in addition the ranks at the two ends may be moved simultaneously in opposite directions. The oppositely acting rank movements may be effected by actuating the rods 7 of the two ranks by separate motors RM, one motor for each rank and the two motors being electrically connected so that they are energized through the same or simultaneously acting switches, but being arranged so that they operate their rods in relatively opposite directions. Similarly the east and west carriage motors may be operated simultaneously but these also would be arranged to move their associated carriage apparatus in relatively opposite directions. The carriage elevator motors at the two ends may also be operated simultaneously but in this case both elevators would, of course, work together, i. e. both would rise at the same time and both would lower at the same time.

The phasing apparatus shown in Fig. 14 would also be modified in that all four of the rods 7 would be simultaneously moved into the operative and inoperative positions. The pilot drum would be modified to permit the new sequence but the modifications necessary here will be obvious to persons skilled in the art. Each carriage movement would be a double movement, i. e. an east and west movement of the rods 7, one of which movements would be an operative and the other an idle movement and following the double rod movement would be a double carriage movement, i. e. a loaded and an unloaded movement.

Whilst the apparatus hereinbefore described has been specifically applicable to automobile storage equipment of the kind described in United States application Serial No. 268,396, it will be appreciated that it is also applicable to the equipment of the kind described in United States application Serial No. 230,488, and moreover automatic equipment may be employed in conjunction with the apparatus of United States application Serial No. 231,244, in which the two ranks are arranged one over the other. In this case the carriage movement of the present application will be replaced by an elevator movement, and whilst the elevator movements of the present case would not be found in the vertically displaced case, provision would be made for withdrawing the supports at the upper ends of the elevator space at the appropriate points in the cycle of movements.

Whilst in the arrangements hereinbefore described and illustrated the cars, and in the case of the arrangement shown in Fig. 4, the platforms have been arranged longitudinally of the ranks, it will be appreciated that this is not necessarily so but that they may if desired be arranged laterally of the ranks, i. e. so that they are moved sideways along the ranks.

The arrangement of Fig. 4 is applicable to warehouses and the like where it is desired to store articles, and especially heavy articles, with economy in the space employed.

This arrangement may also be employed for automobiles, though in this case it will usually be preferable to employ the two-truck arrangement of Figs. 1 and 2 or the four-truck arrangement of Fig. 3, as in such cases the weight of movable apparatus is reduced and the elevator spaces are smaller.

Similarly the arrangements of Figs. 1 and 3 might be employed to support platforms or storage bins in a warehouse or the like.

We claim:

1. Storage equipment including a unit comprising a plurality of movably supported platforms occupying consecutive positions in two co-extensive parallel ranks in substantially lateral alignment with an end position of at least one rank being vacant, rank shifting means comprising a rigid reciprocable member extending longitudinally of each rank, platform engaging means on said members selectively movable alternately into and out of engagement with all the platforms in the respective rank, means for periodically reciprocating said members through a distance corresponding to the spacing of said positions, and phasing means for alternately moving said platform engaging means into and out of engagement with the platforms at opposite ends of the reciprocating strokes of said members, apparatus for transferring platforms between adjacent ends of the two ranks and control apparatus for actuating the rank shifting means and transferring apparatus so as to effect movements automatically in a recurring cycle such as to circulate platforms around the unit, said control apparatus including a multi-position control device which initiates a sequence of such cycles in accordance with its positioning, follow-up apparatus actuated upon the completion of a cycle to step the control device forward to the next position to initiate a new cycle and means for arresting movement of the control device in said next position until completion of the corresponding cycle.

2. Storage equipment as claimed in claim 1, wherein said phasing means is operated in dependence on the operation of said transferring apparatus.

3. Storage equipment as claimed in claim 1, wherein each member is a rod having spaced lateral projections adapted to be brought into and out of engagement with an integral part of all the platforms in the respective rank by rotation of said rod, and wherein said phasing means comprise means for rotating said rod from a disengaged to an engaged position and vice versa.

4. Storage equipment as claimed in claim 1, wherein said platforms are severally equipped with a depending lug and said member is a rod having end portions of polygonal section and spaced laterally projecting forks adapted to be brought into and out of engagement with said lugs on all the platforms in the respective rank by oscillation of said rod through an angle of substantially 90°, and wherein said phasing means comprises an oscillatable socket adapted to receive each of said polygonal end portions at each end of the reciprocating stroke of said rod and means operated in dependence upon the operation of said transferring apparatus for oscillating said sockets during the intervals between consecutive movements of said rods.

5. Storage equipment for automobiles including a unit having a plurality of movable sets of platforms occupying consecutive positions in two co-extensive parallel ranks, each set comprising at least two spaced platforms for supporting the wheels of each automobile so arranged that not more than two wheels of the automobile will rest on the same platform and diagonally opposite wheels will rest on different platforms, rank shifting means comprising a rigid reciprocable member extending longitudinally of each rank, platform engaging means on said members selectively movable alternately into and out of engagement with all the platforms in the respective rank, means for periodically reciprocating said members through a distance corresponding to the spacing of said positions, and phasing means for alternately moving said platform engaging means into and out of engagement with the platforms at opposite ends of the reciprocating strokes of said members, apparatus for transferring the sets of platforms between adjacent ends of the two ranks while maintaining the relative positioning of the component platforms of a set, and control apparatus operatively connected both with the rank shifting and with the transfer apparatus whereby rank shifting and transfer movements are performed in a recurring cycle so as to circulate the sets of platforms and hence the automobiles supported thereby to obtain a desired positioning, at least one end position of a rank being vacant of platforms to permit the shifting and transfer movements.

6. Storage equipment including a unit comprising a plurality of movably supported platforms occupying consecutive positions in two co-extensive parallel ranks in substantially the same horizontal plane, rank shifting means comprising a rigid reciprocable member extending longitudinally of each rank, platform engaging means on said members selectively movable alternately into and out of engagement with all the platforms in the respective rank, means for periodically reciprocating said members through a distance corresponding to the spacing of said positions, and phasing means for alternately moving said platform engaging means into and out of engagement with the platforms at opposite ends of the reciprocating strokes of said members, apparatus at each end of the unit for transferring platforms between adjacent ends of the two ranks, said transfer apparatus comprising carriage apparatus movable between positions beneath adjacent ends of the two ranks, supports for platforms in the end rank positions, means for effecting relative vertical movement between said end supports and said carriage apparatus for loading and unloading said carriage apparatus, control apparatus for controlling the rank shifting means, carriage apparatus and loading and unloading means so as to circulate the platforms around the unit, at least one position being vacant of platforms to permit such movements, and selector apparatus for causing said control apparatus to effect a predetermined number of cycles so as to obtain a desired positioning of the platforms in the unit.

7. Storage equipment including a unit comprising a plurality of movably supported platforms occupying consecutive positions in two co-extensive parallel ranks in substantial lateral alignment an end position in at least one rank being vacant, rank shifting means comprising a rigid reciprocable member extending longitudinally of each rank, platform engaging means on said members selectively movable alternately into and out of engagement with all the platforms in the respective rank, means for periodically reciprocating said members through a distance corresponding to the spacing of said positions, and phasing means for alternately moving said platform engaging means into and out of engagement with the platforms at opposite ends of the reciprocating strokes of said members, apparatus for transferring platforms between adjacent ends of the two ranks, control apparatus for actuating the rank shifting means and transferring apparatus so as to effect the movements automatically in a sequence such as to circulate the platforms around the unit, said control apparatus including a multi-position control device which initiates the platform movements in accordance with its positioning, follow-up apparatus actuated upon the completion of a platform movement to step the control device forward into the next position and means for arresting movement of said control device until completion of the corresponding platform movement, together with preselector apparatus which supervises the said control apparatus, and in accordance with its setting causes said control device to effect a predetermined number of cycles of movement so as to obtain a desired positioning of the platforms, said control apparatus providing alternative sequences of movements respectively effecting circulation in alternate directions, and said preselector apparatus selecting the direction of circulation such as to obtain the desired platform positioning in the smaller number of cycles of movements.

8. Storage equipment for automobiles, as claimed in claim 7, wherein said unit comprises a plurality of sets of movable platforms occupying consecutive positions in two co-extensive parallel ranks which are in substantially the same horizontal plane, said platforms including a set of at least two spaced platforms for supporting the wheels of each automobile so arranged that no more than two wheels will rest on the same platform and diagonally opposite wheels will rest on different platforms.

9. Storage equipment including a unit comprising a plurality of movably supported platforms occupying consecutive positions in two co-extensive parallel ranks in lateral alignment, rank shifting means comprising a rigid reciprocable member extending longitudinally of each rank, platform engaging means on said members selectively movable alternately into and out of engagement with all the platforms in the respective rank, means for periodically reciprocating said members through a distance corresponding to the spacing of said positions, and phasing means for alternately moving said platform engaging means into and out of engagement with the platforms at opposite ends of the reciprocating strokes of said members, apparatus for transferring platforms between adjacent ends of the two ranks, control apparatus for actuating the said rank shifting means and transferring apparatus so as to effect automatic circulation of the platforms around the unit in respectively alternate directions, at least one position being vacant of platforms to permit of such circulation, together with preselector apparatus which causes said control apparatus to effect a predetermined number of cycles of movement so as to obtain the desired positioning of the platforms, said preselector apparatus also causing said control apparatus to effect circulation in a direction so as to obtain the desired positioning in the smaller number of cycles, together with protective means which when a selection has been made and the apparatus is in operation prevents a further selection being put into effect until a previous platform positioning has been obtained.

10. Storage equipment for automobiles as claimed in claim 9, wherein said unit comprises a plurality of sets of movable platforms occupying consecutive positions in two co-extensive parallel ranks which are in substantially the same horizontal plane, each of said sets comprising at least two spaced platforms for supporting the wheels of each automobile so arranged that not more than two wheels of the automobile will rest on the same platform and diagonally opposite wheels will rest on different platforms.

11. Storage equipment including a unit comprising a floor, a plurality of platforms for supporting articles movably supported on said floor and occupying consecutive positions in two co-extensive parallel ranks, rank shifting means comprising a rigid reciprocable member extending longitudinally of each rank, platform engaging means on said members, selectively movable alternately into and out of engagement with all the platforms in the respective rank, means for periodically reciprocating said members through a distance corresponding to the spacing of said positions, and phasing means for alternately moving said platform engaging means into and out of engagement with the platforms at opposite ends of the reciprocating strokes of said members, apparatus for transferring platforms between adjacent end positions of the two ranks, said transfer apparatus comprising a vertically displaceable support for a platform in an end rank position adapted to lower said platform from rank level on to carriage apparatus, means for moving said carriage apparatus from said end position to the other, and means for raising the platforms from the transfer apparatus to rank level at said other position, control apparatus for actuating the rank shifting means, the end rank supports and the transfer apparatus so as to circulate platforms around the unit, at least one end rank position being vacant of platforms to permit such circulation and selector apparatus arranged to supervise the control apparatus so as to effect a predetermined number of cycles of movement, means for lowering a platform at at least one end of the unit so that the platform surfaces are substantially flush with the floor surface at the conclusion of the selected number of cycles and means for initially raising said platforms when a fresh selection is made.

HAROLD AUGER.
NATALIE PEARSON NICHOLSON,
*Executrix of the Estate of Ward Edgerly Pearson, Deceased.*